US012030764B2

(12) United States Patent
Boscaro et al.

(10) Patent No.: US 12,030,764 B2
(45) Date of Patent: Jul. 9, 2024

(54) BOTTLE CENTERING DEVICE FOR A CAPPING MACHINE FOR CAPS MADE OF COMPRESSIBLE MATERIAL AND CAPPING MACHINE FOR CAPS MADE OF COMPRESSIBLE MATERIAL PROVIDED WITH SUCH BOTTLE CENTERING DEVICE

(71) Applicant: MBF S.P.A., Verona (IT)

(72) Inventors: Giuliano Boscaro, Verona (IT); Alessandro Ticinelli, Verona (IT); Andrea Stella, Verona (IT)

(73) Assignee: MBF S.P.A., Verona (IT)

( * ) Notice: Subject to any disclaimer, the term of this patent is extended or adjusted under 35 U.S.C. 154(b) by 0 days.

(21) Appl. No.: 17/869,602

(22) Filed: Jul. 20, 2022

(65) Prior Publication Data

US 2023/0026236 A1 Jan. 26, 2023

(30) Foreign Application Priority Data

Jul. 22, 2021 (IT) ........................ 102021000019541

(51) Int. Cl.
*B67B 1/04* (2006.01)

(52) U.S. Cl.
CPC .......... *B67B 1/04* (2013.01); *B67B 2201/015* (2013.01)

(58) Field of Classification Search
CPC . B67B 1/04; B67B 2201/01; B67B 2201/012; B67B 2201/015

(Continued)

(56) References Cited

U.S. PATENT DOCUMENTS 785,001 A * 3/1905 Hicks ........................ B67C 7/00 53/324
907,672 A * 12/1908 Alexander ................ B67B 3/10 53/324

(Continued)

FOREIGN PATENT DOCUMENTS

DE 20 2020 104 970 U1 10/2020
DE 20 2020 104970 U1 11/2020

(Continued)

OTHER PUBLICATIONS

Italian Search Report for Italian Patent Application No. 102021000019541 dated Apr. 8, 2022, 12 pages.

(Continued)

*Primary Examiner* — Stephen F. Gerrity
(74) *Attorney, Agent, or Firm* — Merchant & Gould P.C.

(57) ABSTRACT

A bottle centering device for a capping machine for caps made of compressible material includes a support structure, associated with a compression box at a cap compression seat and defining an opening for passing a compressed cap and a cap insertion punch. The support structure is mountable on the compression box so that the through opening has a central axis axially centered on the cap compression seat. A bottle centerer defining an invitation seat and a central through opening is configured for engagement by a bottle mouth and is shaped to guide the mouth towards the through opening axially aligning with the central axis. The bottle centerer includes pieces angularly distributed about the central axis and each partially defining a portion of the invitation seat. The pieces are radially movable with respect to the central axis to vary radial dimensions of the invitation seat and the central through opening.

15 Claims, 13 Drawing Sheets

(58) Field of Classification Search
USPC ......... 53/300, 306, 308, 310, 311, 312, 319, 53/324, 367
See application file for complete search history.

(56) References Cited

U.S. PATENT DOCUMENTS

| | | | | | |
|---|---|---|---|---|---|
| 1,863,223 | A * | 6/1932 | Kantor | B67B 3/064 53/310 |
| 1,956,218 | A * | 4/1934 | Huntley et al. | B67B 3/14 53/310 |
| 2017/0297758 | A1* | 10/2017 | Stenner | B67C 3/242 |

FOREIGN PATENT DOCUMENTS

| | | | |
|---|---|---|---|
| EP | 1 426 322 | B1 | 11/2005 |
| EP | 2 860 148 | A1 | 4/2015 |
| EP | 2860148 | A1 | 4/2015 |
| EP | 3 825 276 | A1 | 5/2021 |
| EP | 3825276 | A1 | 5/2021 |
| JP | 6160492 | A | 3/1986 |
| JP | S61-60492 | A | 3/1986 |
| WO | 2018/203242 | A1 | 11/2018 |
| WO | 2018203242 | A1 | 11/2018 |

OTHER PUBLICATIONS

Extended European Search Report received for EP Application No. 22184993.8 dated Dec. 20, 2022, 7 pgs.

* cited by examiner

BOTTLE CENTERING DEVICE FOR A CAPPING MACHINE FOR CAPS MADE OF COMPRESSIBLE MATERIAL AND CAPPING MACHINE FOR CAPS MADE OF COMPRESSIBLE MATERIAL PROVIDED WITH SUCH BOTTLE CENTERING DEVICE

CROSS-REFERENCE TO RELATED APPLICATION

This application claims benefit of Ser. No. 102021000019541, filed on 22 Jul. 2021 in Italy, and which application is incorporated herein by reference. To the extent appropriate, a claim of priority is made to the above-disclosed application.

FIELD OF APPLICATION

The present invention relates to a bottle centering device for a capping machine for caps made of compressible material and to a capping machine for caps made of compressible material provided with such bottle centering device.

The bottle centering device according to the invention may be used both in single capping machines and in multiple capping machines, of the rotary type.

PRIOR ART

In a capping machine for caps made of compressible material (cork or elastomeric material), illustrated for example in FIG. 1, the cap T is radially pre-compressed in a compression seat S defined by a compression unit G by a plurality of movable compression pieces (not shown). The compression unit G is housed in a special cavity formed in a so-called compression box F. In turn, the compression box F is provided with two openings, a lower F1 and an upper F2 aligned with the compression seat S. Through the action of an insertion punch P, axially aligned with the two openings F1 and F2 and the compression seat S, the compressed cap is then pushed into the neck of the bottle B located below the compression box. To ensure that there is perfect alignment between the axis of the bottle on one side and the axis of the compressed cap (corresponding to the axis of the compression seat) and the axis of the insertion punch on the other, the compression box is provided at the bottom with a centering device C at which the bottle abuts with the mouth. An example of a capping machine is described in the Italian patent for utility model 214969.

The centering of the bottle with respect to the compression seat of the capping machine should be carried out extremely precisely to ensure that, when the punch P pushes the cap T out of the compression seat S in its downward stroke, the cap fits perfectly into the neck of the bottle to the desired depth.

It is therefore evident that the centering of the bottle with respect to the compression seat is a fundamental operation for a correct introduction of the cap into the bottle. A slight misalignment of the elements involved (bottle B, cap T and punch P) would in fact generate an incorrect introduction of the cap with consequent compromise of the capping.

Generally, centering devices called centering cones or mouthpieces are used to ensure such centering. As illustrated in FIGS. 1 to 5, the centering cone C consists of an annular body having an inner through hole A which is axially centered with the insertion punch P and with the compression seat S defined by the compression unit G. The inner hole A of the centering cone C is delimited by a truncated conical surface C1 converging upwards. Operationally, when the bottle is pushed upwards by the lifting cylinders E to approach the compression seat S, it rests with its end on the truncated conical surface C1 and, by sliding on it, is guided towards a position axially centered with respect to the compression seat S.

Generally, to ensure perfect centering of the bottles, dedicated centering cones are used for each single size of the bottle mouth. This choice, which is essential to ensure perfect centering, however, involves the need to replace the centering cones C at each change in the size of the bottle mouth. This operation requires having a set of centering cones for each mouth size. Furthermore, in its execution this operation inevitably involves long downtimes for the disassembly of the centering cone and the assembly of the new centering cone. There is also a risk of errors in the installation of the centering cones.

In the field of capping machines for caps made of compressible material, there is therefore a great need to simplify the operations necessary to adapt the centering cones to the different sizes of bottle mouths.

DISCLOSURE OF THE INVENTION

Therefore, the main object of the present invention is to eliminate in whole or in part the drawbacks of the aforementioned prior art, by providing a bottle centering device for capping machines for caps made of compressible material which allows the operations for adjusting to the different formats of bottle mouths in a capping machine to be simplified.

A further object of the present invention is to provide a bottle centering device for capping machines for caps made of compressible material which is operationally simple to use.

A further object of the present invention is to provide a bottle centering device for capping machines for caps made of compressible material which is operationally effective in centering the bottle.

A further object of the present invention is to provide a bottle centering device for capping machines for caps made of compressible material which is constructively simple to manufacture.

BRIEF DESCRIPTION OF THE DRAWINGS

The technical features of the invention, according to the aforesaid objects, may be clearly seen in the contents of the claims below, and its advantages will become more readily apparent in the detailed description that follows, made with reference to the accompanying drawings, which represent one or more purely exemplifying and non-limiting embodiments thereof, in which:

DETAILED DESCRIPTION

Figure 1:
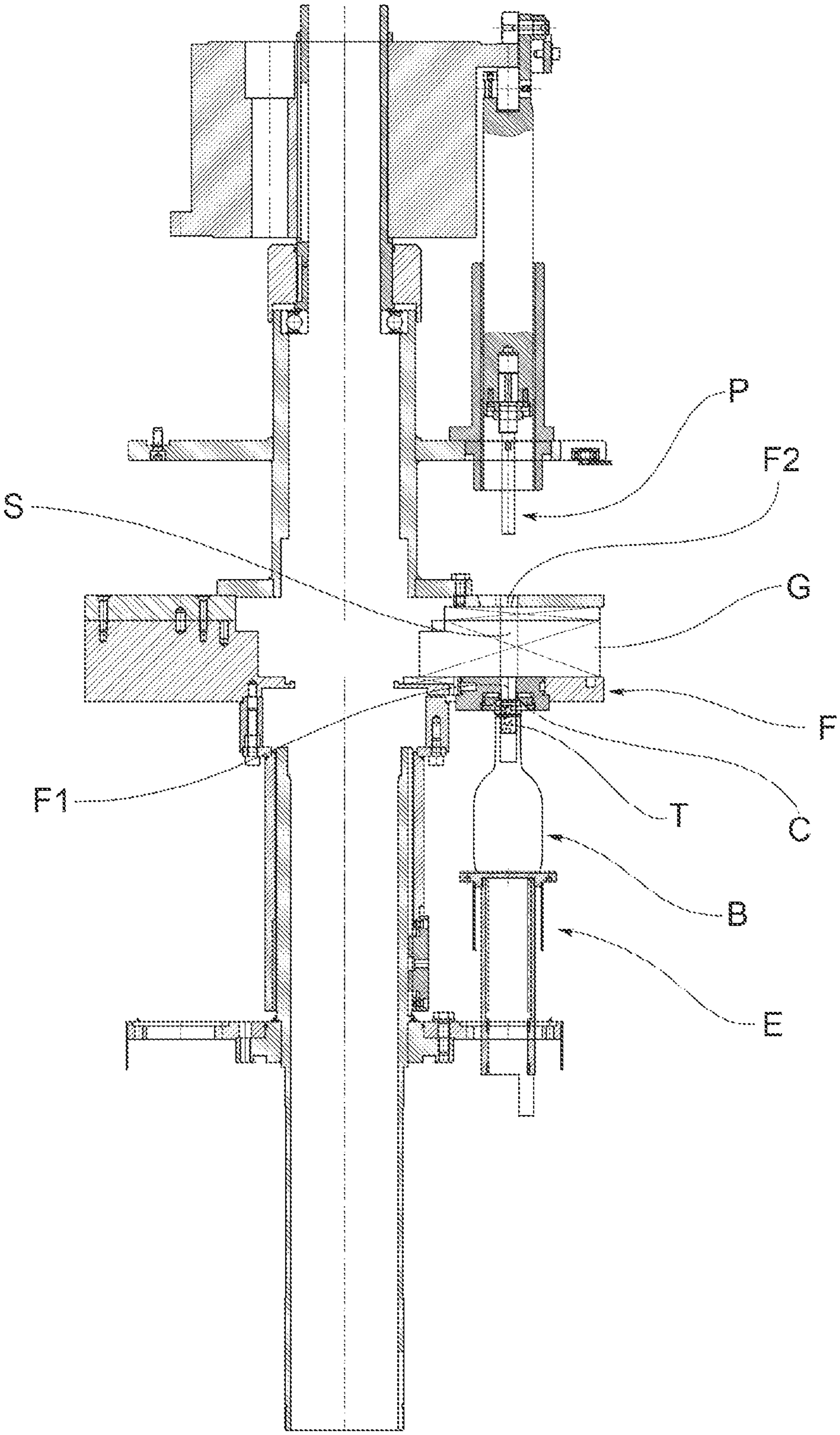
FIG. 1 shows a simplified sectional view of a traditional capping machine for caps made of compressible material.
Figure 2:
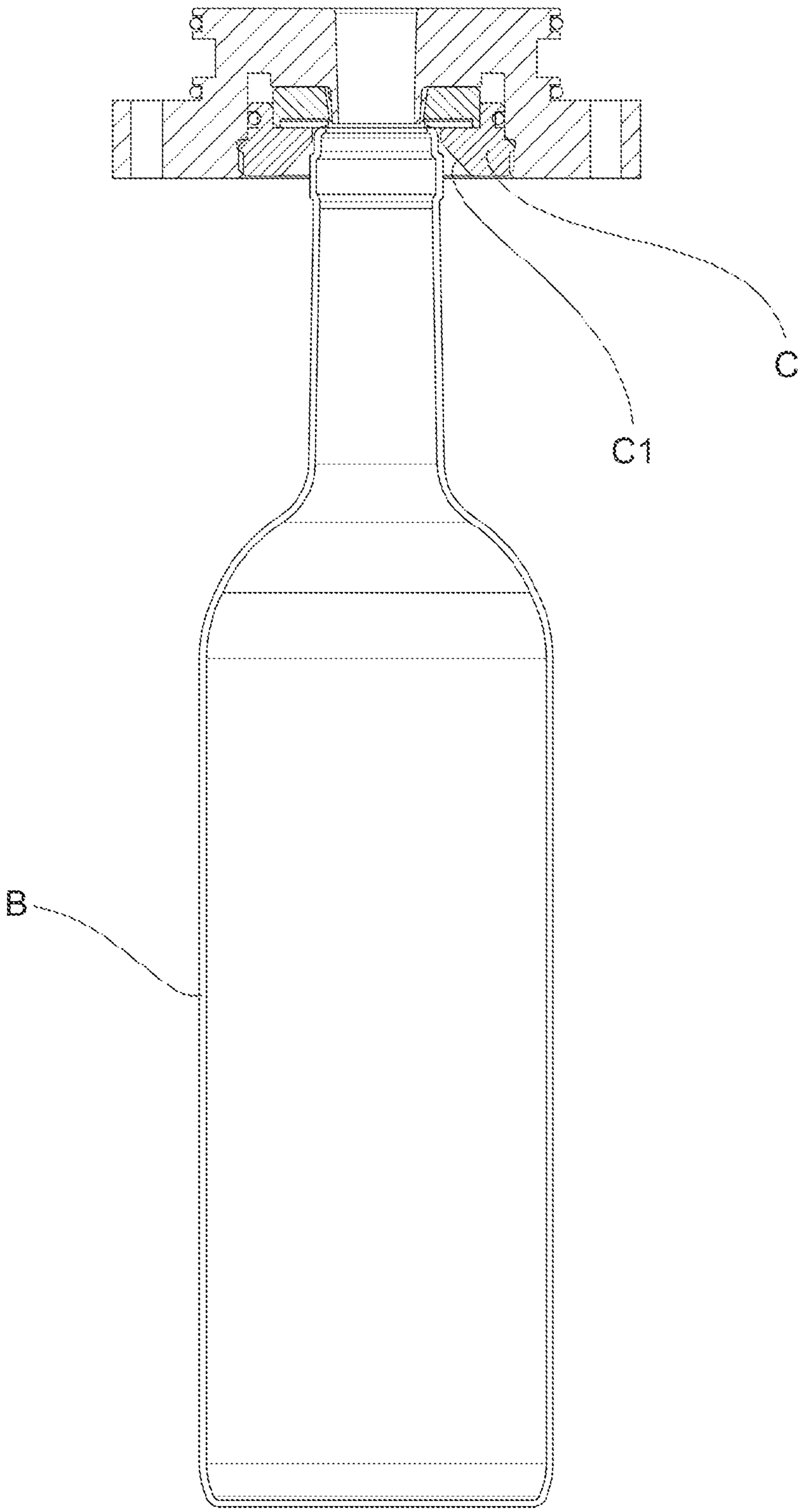
FIG. 2 shows an enlarged detail of only the centering means of the machine of FIG. 1, illustrated in a condition of engagement by a bottle.
Figure 5:
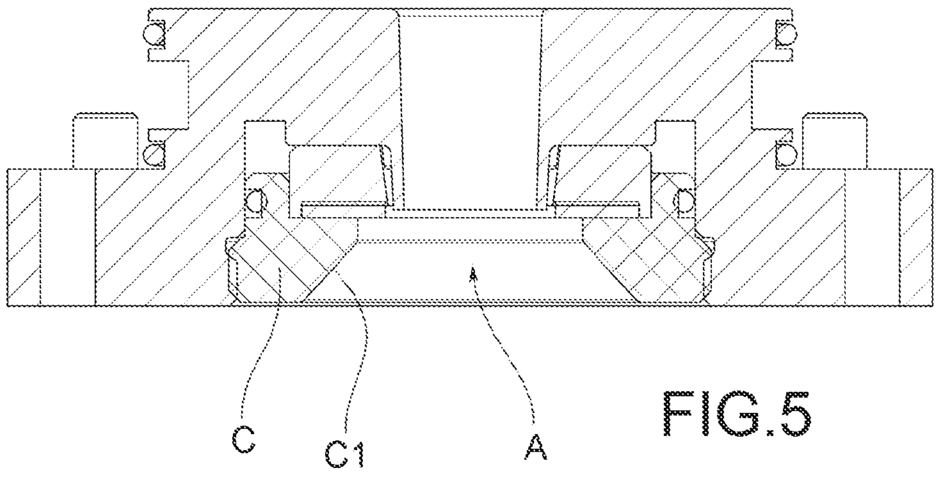
FIG. 5 shows an orthogonal sectional view of the centering means of FIG. 4 according to the section plane V-V indicated therein.
Figure 3:
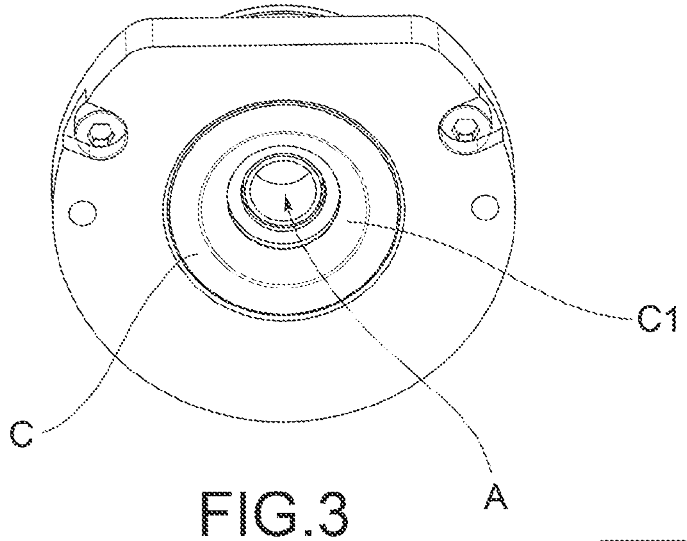
FIG. 3 shows a bottom perspective view of the centering means of the machine of FIG. 1.
Figure 4:
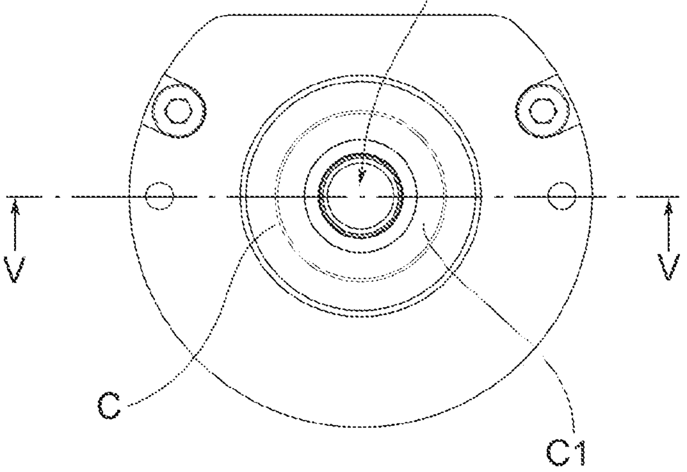
FIG. 4 shows a bottom orthogonal view of the centering means of FIG. 3.

The present invention relates to a bottle centering device for a capping machine for caps made of compressible material and to a capping machine for caps made of compressible material provided with such bottle centering device.

The bottle centering device will be indicated as a whole with reference numeral 1 in the accompanying figures, while the capping machine will be indicated as a whole with reference numeral 100.

Herein and in the following of the description and the claims, reference will be made to the bottle centering device 1 and to the capping machine 100 in use condition. Therefore, any references to a lower or upper position or to a horizontal or vertical orientation should be interpreted in this sense.

The bottle centering device 1 according to the invention is configured to be operatively associated with a capping machine for caps made of compressible material.

Figure 20:
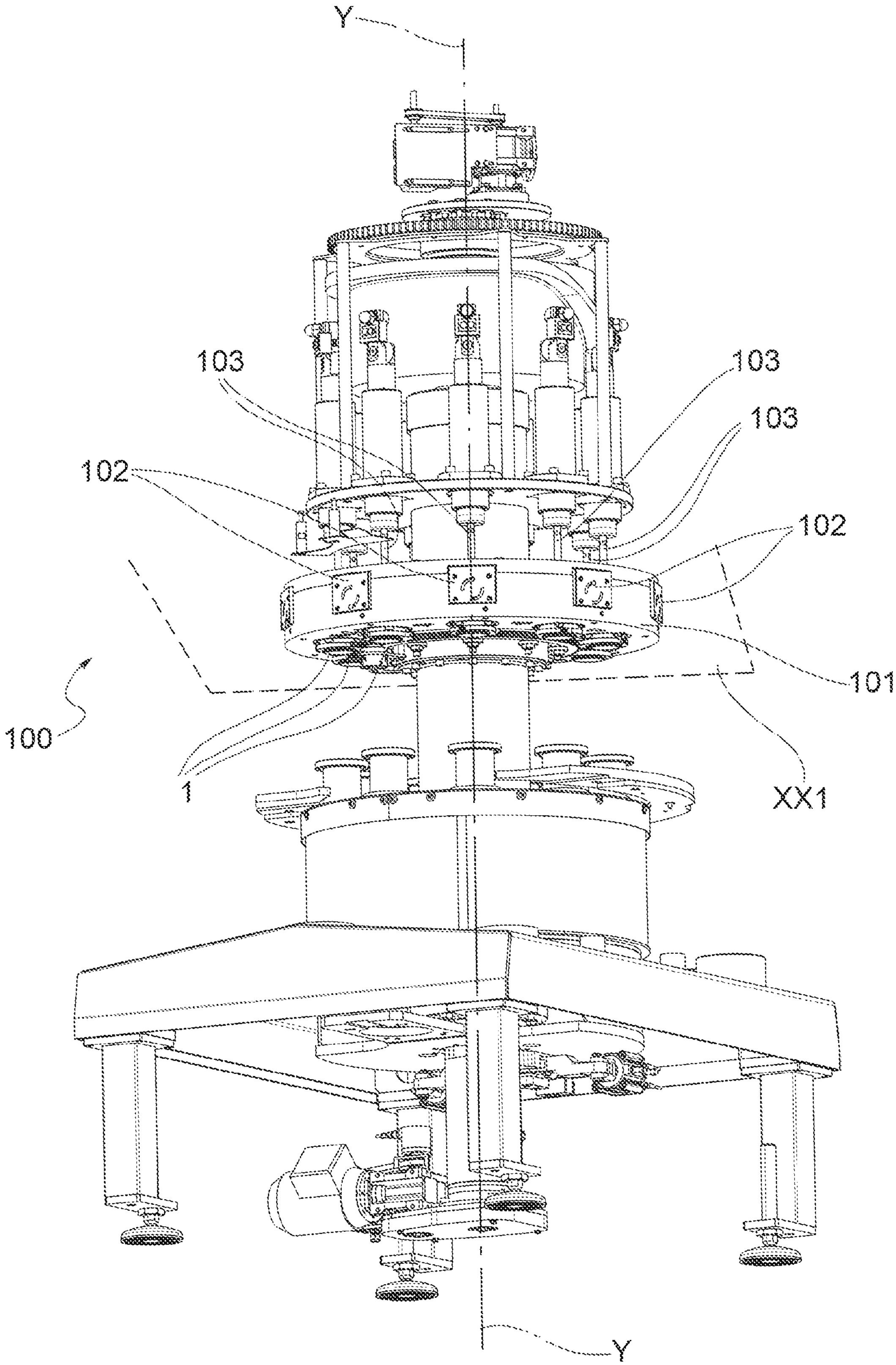
FIG. 20 shows a bottom perspective view of a capping machine for cork caps according to a preferred embodiment of the present invention.
Figure 21:
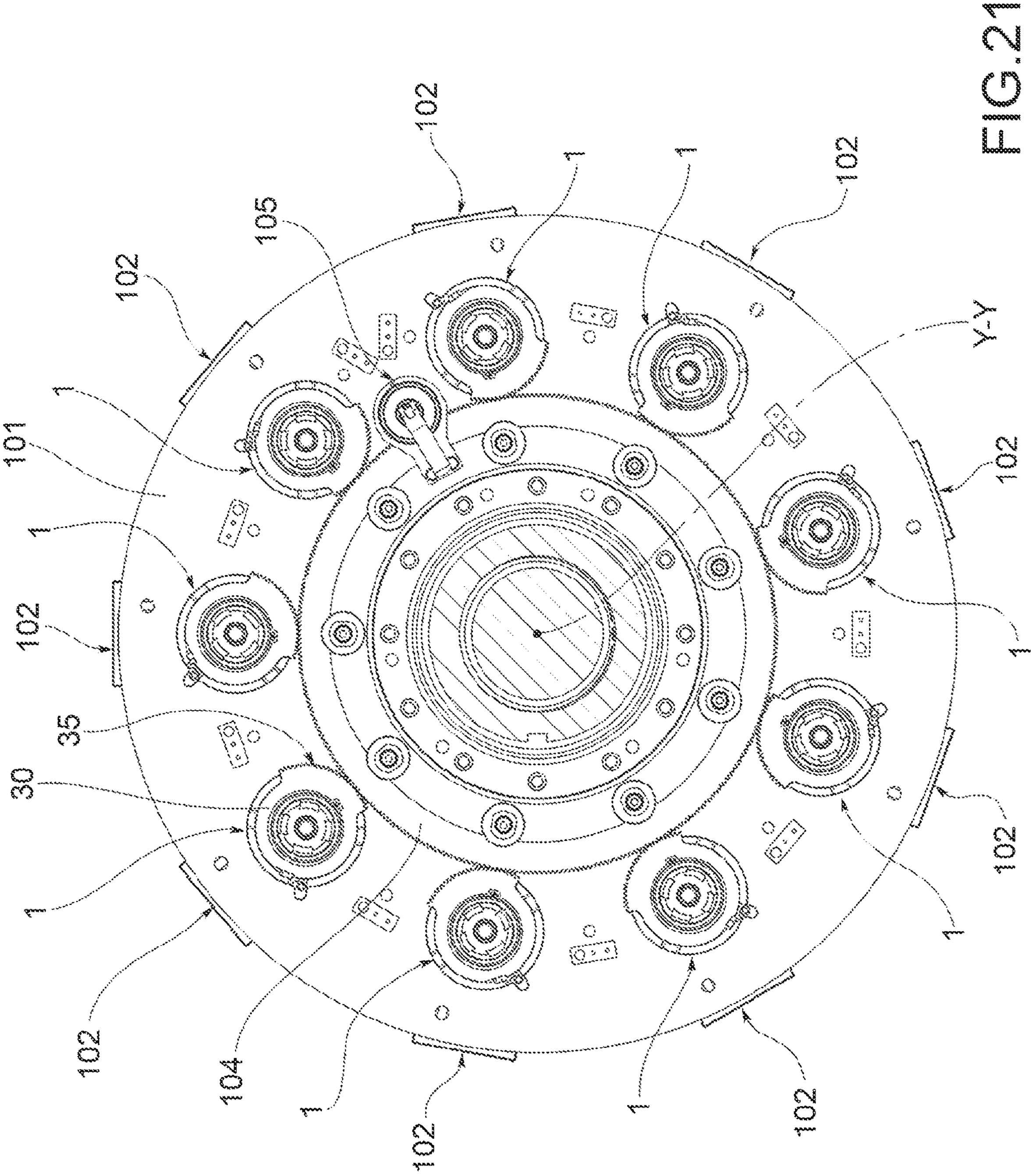
FIG. 21 shows an orthogonal sectional view of the machine of FIG. 20 according to the section plane XXI-XXI indicated therein.
Figure 22:
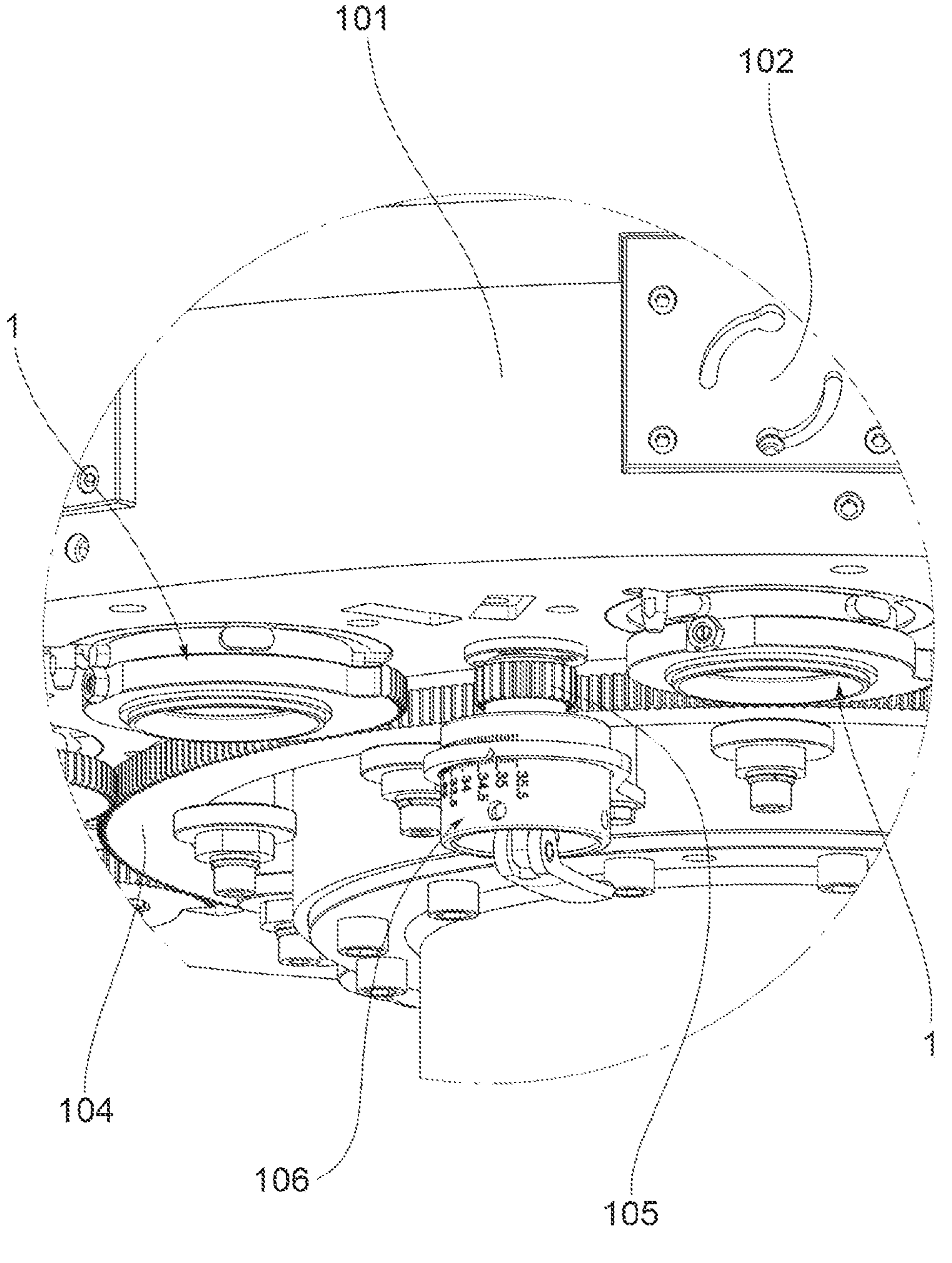
FIG. 22 shows an enlarged detail of the machine of FIG. 20 relating to centralized adjustment means.

The bottle centering device 1 according to the invention may be used both in single capping machines and in multiple capping machines, of the rotary type. An example of a multiple capping machine provided with a plurality of bottle centering devices 1 according to the invention is illustrated in FIGS. 20 to 22.

Figure 8:
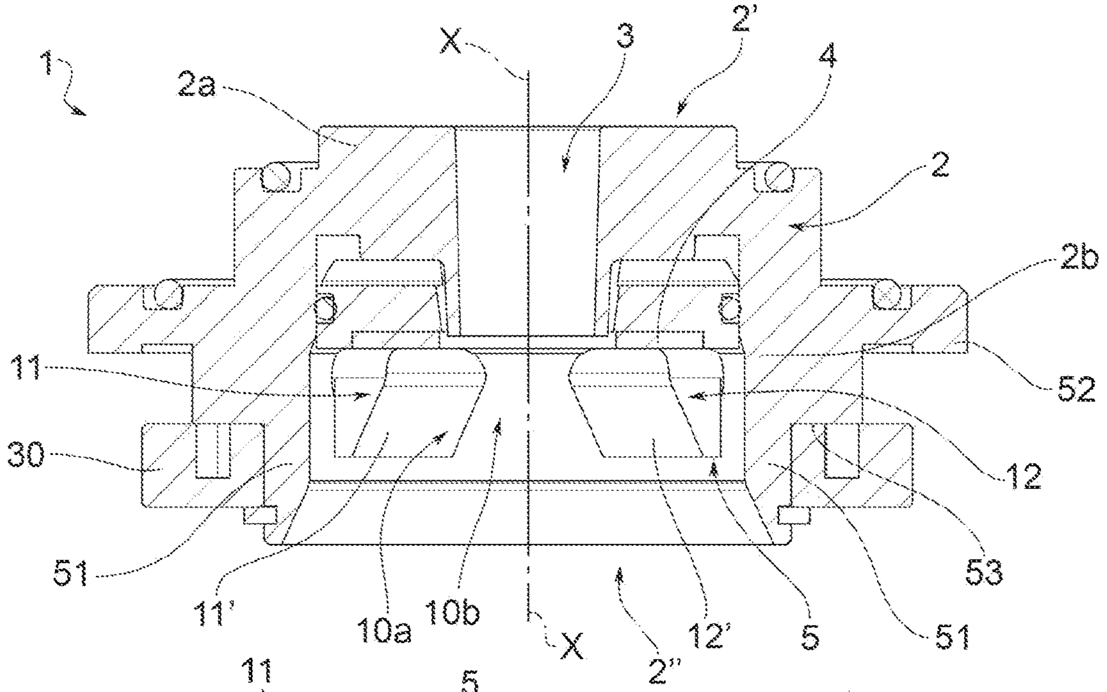
FIG. 8 shows an orthogonal sectional view of the bottle centering device of FIG. 7 according to the section plane VIII-VIII indicated therein.
Figure 6:
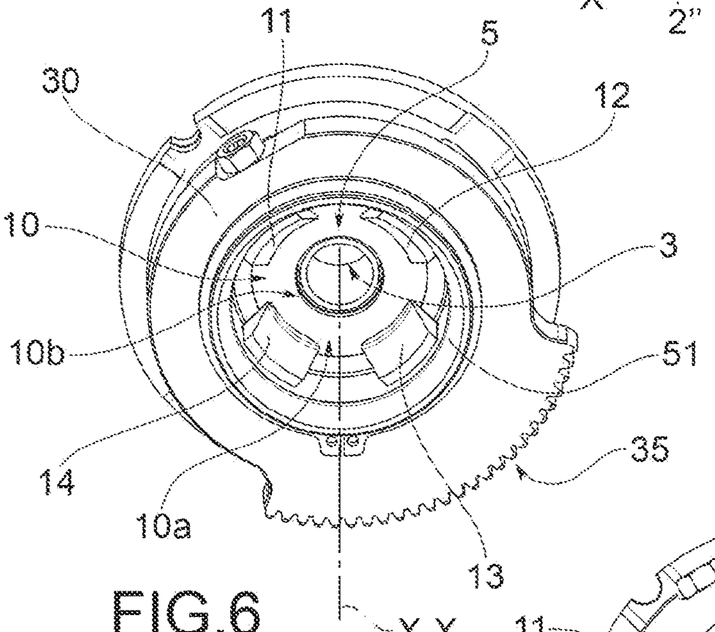
FIG. 6 shows a bottom perspective view of a bottle centering device for a capping machine for caps made of compressible material according to a preferred embodiment of the invention.
Figure 7:
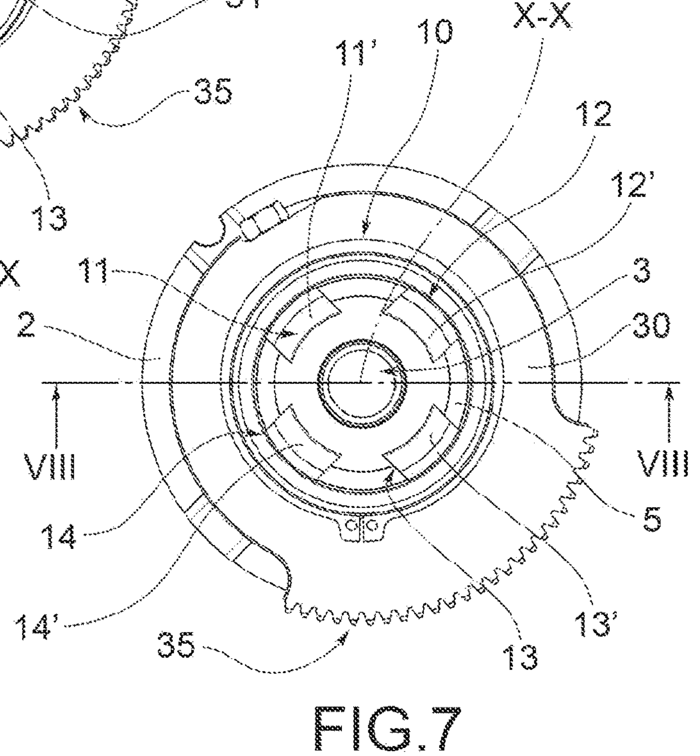
FIG. 7 shows a bottom orthogonal view of the bottle centering device of FIG. 6.
Figure 9:
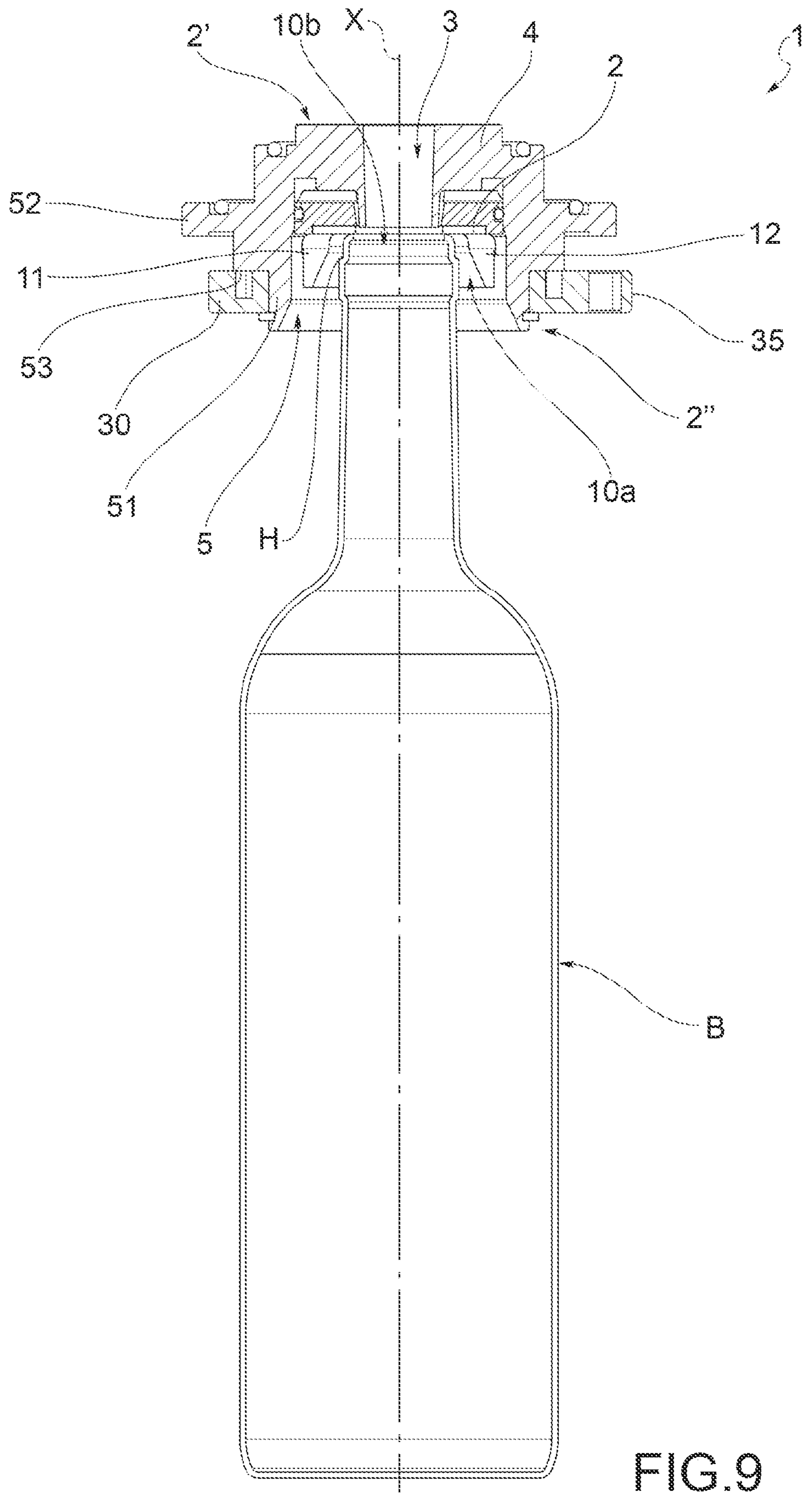
FIG. 9 shows the bottle centering device of FIG. 8, shown in a condition of engagement by a bottle.
Figure 23:
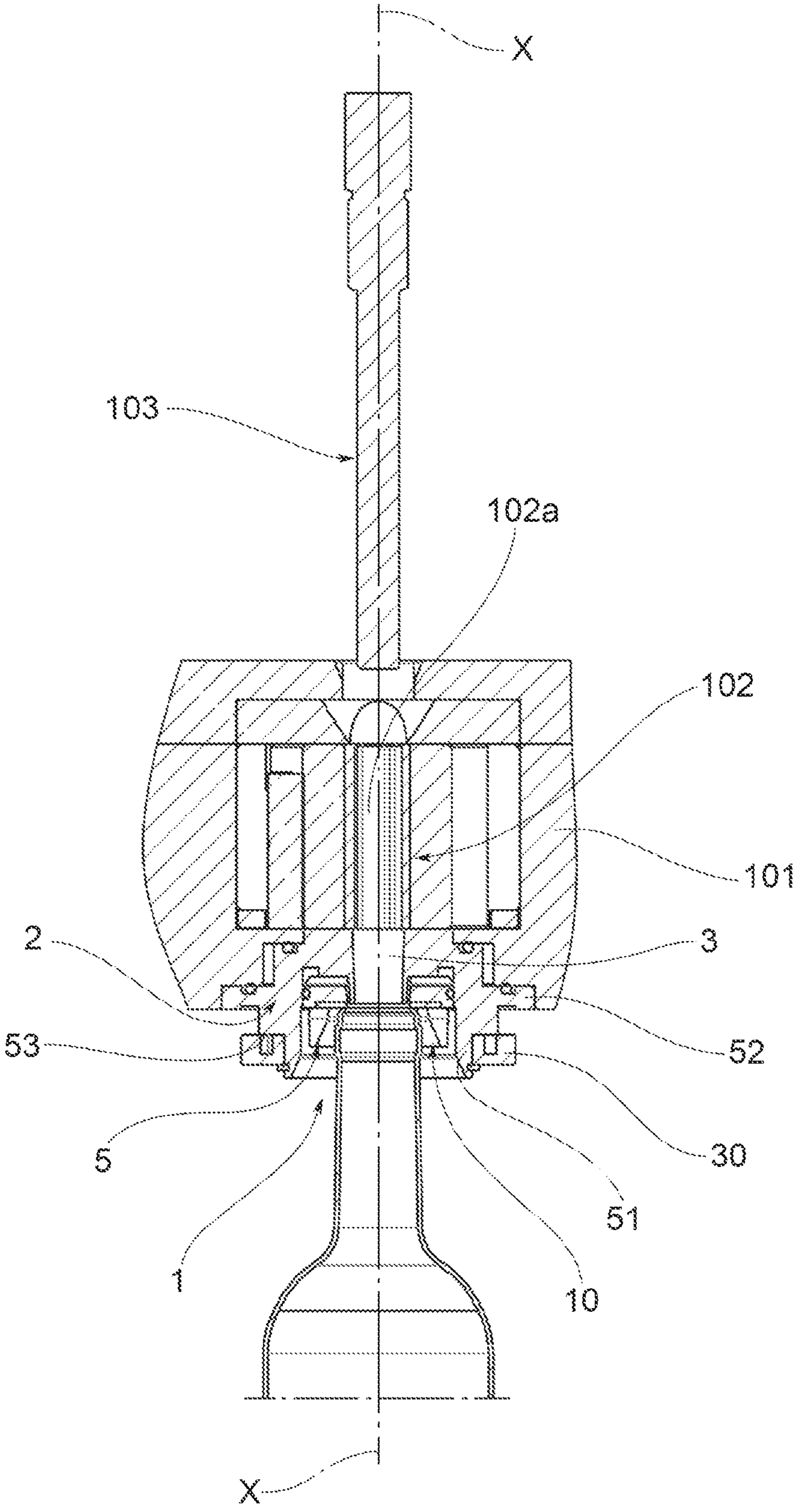
FIG. 23 shows an orthogonal sectional view of the bottle centering device of FIG. 8, associated with the compression box of a capping machine.

As shown in particular in FIGS. 8 and 23, the bottle centering device 1 comprises a support structure 2, which is intended to be associated with a compression box 101 of a capping machine 100 at a cap compression seat 102*a*, defined by a cap compression unit 102.

In general, a capping machine 100 for caps made of compressible material, on which the bottle centering device 1 according to the invention is intended to be mounted, is known per se to those skilled in the art. For this reason, a detailed description of such capping machine 100 and in particular of the compression box 101 and of the cap compression unit 102 which defines the cap compression seat will not be provided. The compression box 101 and the cap compression unit 102 may be of any type. In particular, the cap compression unit 102 may be of the type described in the Italian utility model 214969 or in the European patent EP 1426322 B1.

The support structure 2 of the bottle centering device 1 defines a through opening 3 for the passage of a compressed cap and of a cap insertion punch 103 of said capping machine 100.

As shown in particular in FIG. 23, the support structure 2 is intended to be mounted on the compression box 101 in such a way that the through opening 3 has its own central axis X axially centered on said cap compression seat 102*a*.

The bottle centering device 1 also comprises bottle centering means 10 which are associated with said support structure 2.

Such bottle centering means 10 define an invitation seat 10*a* which in turn:

- defines a central through opening 10*b*,
- is intended in use to be engaged by a mouth H of a bottle B to be capped, and
- is shaped to guide said mouth H towards said through opening 3 axially aligning the mouth H itself (and therefore the neck of the bottle itself) with the central axis X of the through opening 3.

According to the invention, the aforementioned bottle centering means 10 comprise a plurality of pieces 11, 12, 13, 14 which are angularly distributed around the central axis X of said through opening 3. Each of said pieces 11, 12, 13, 14 defines with a respective shaped head 11', 12', 13', 14' a portion of the aforementioned invitation seat 10*a*.

Figure 13:
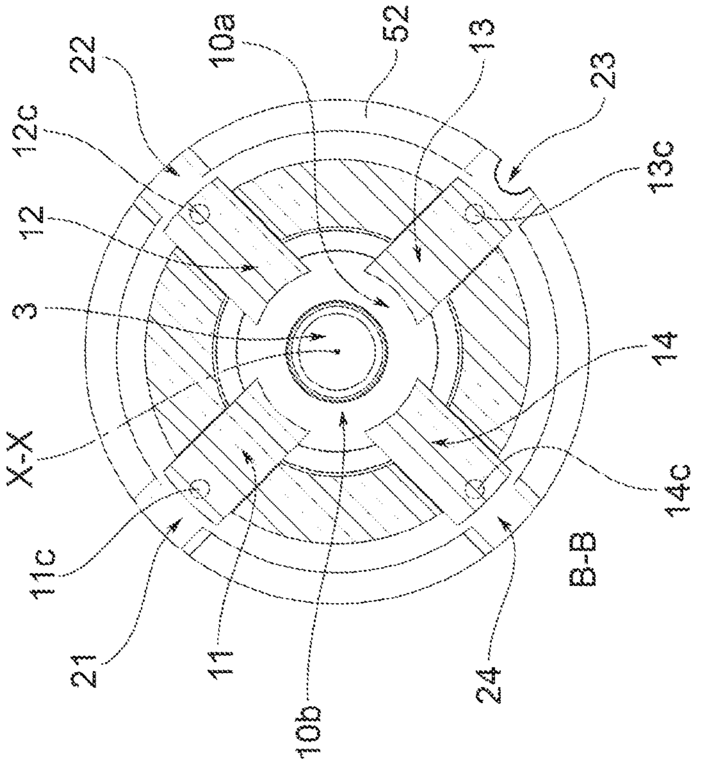
FIG. 13 shows an orthogonal sectional view of the bottle centering device of FIG. 11 according to the section plane B-B indicated therein.
Figure 12:
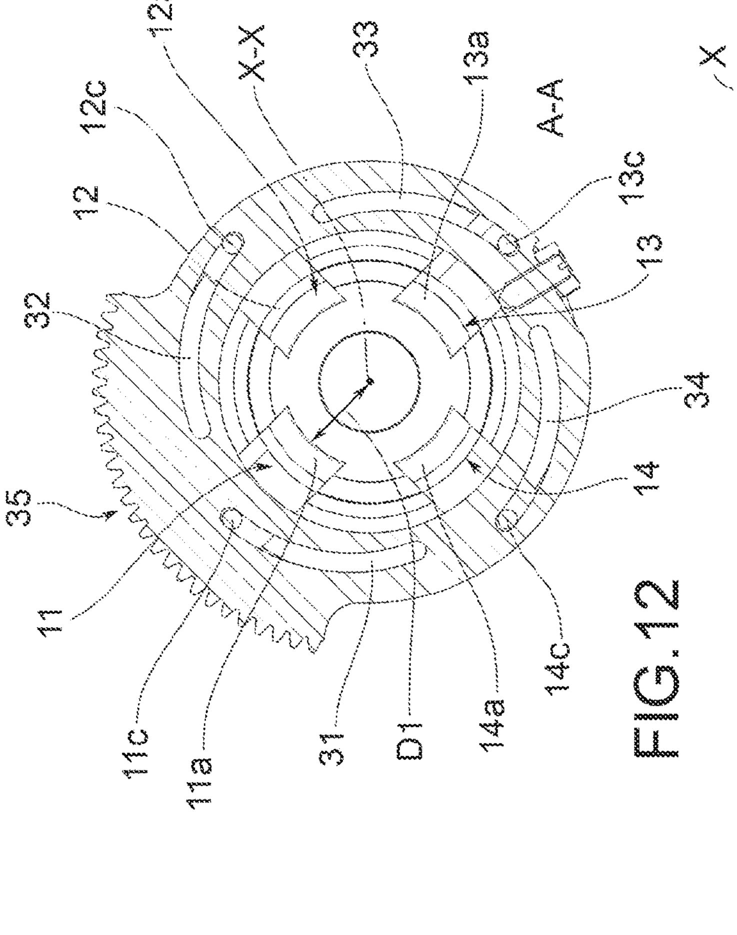
FIG. 12 shows an orthogonal sectional view of the bottle centering device of FIG. 11 according to the section plane A-A indicated therein.
Figure 11:
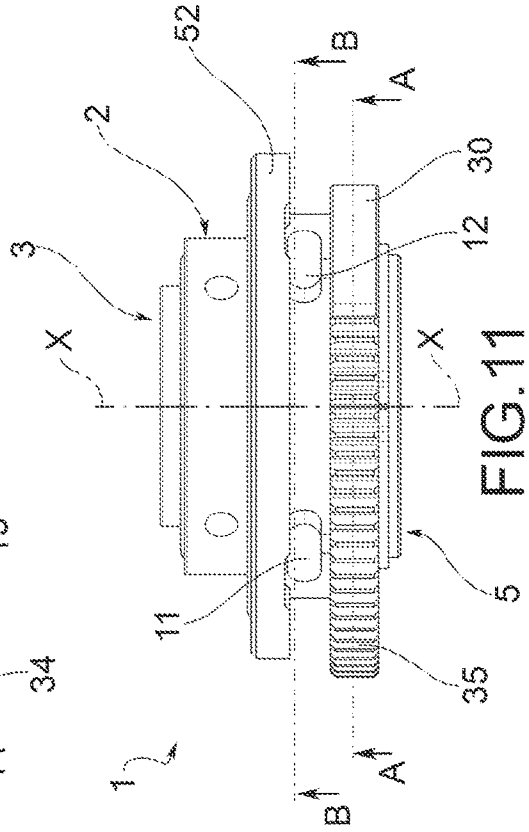
FIG. 11 shows an orthogonal elevation view of the bottle centering device of FIG. 7, illustrated with adjustment means arranged in a first operating position.
Figure 16:
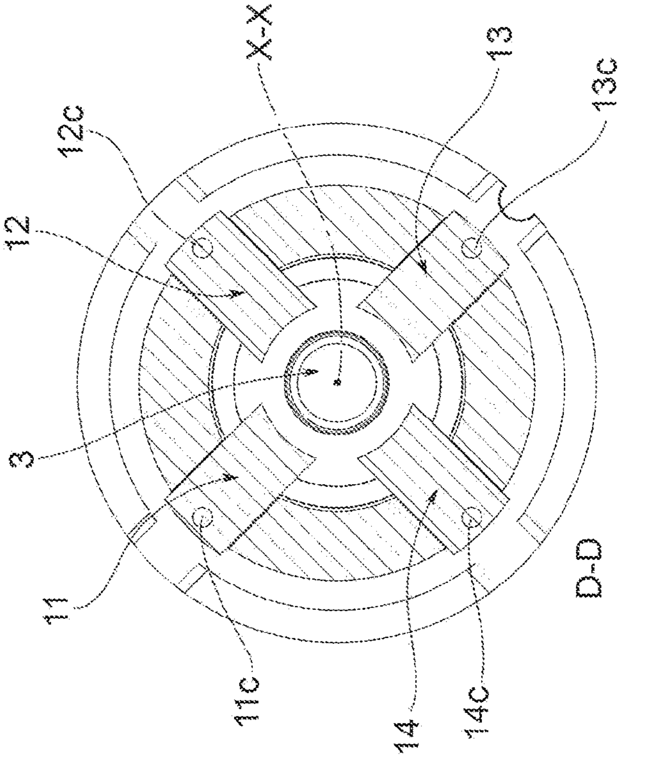
FIG. 16 shows an orthogonal sectional view of the bottle centering device of FIG. 14 according to the section plane D-D indicated therein.
Figure 15:
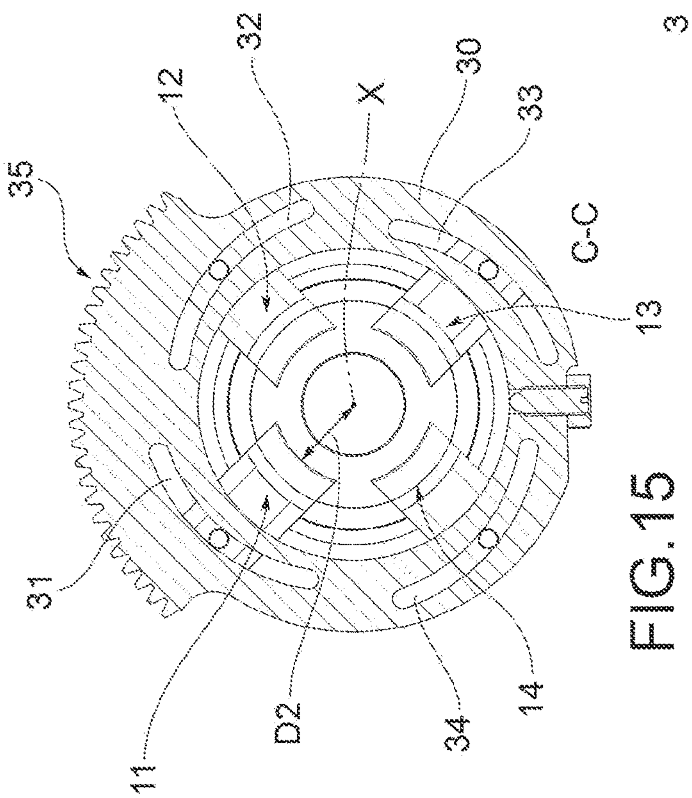
FIG. 15 shows an orthogonal sectional view of the bottle centering device of FIG. 14 according to the section C-C indicated therein.
Figure 14:
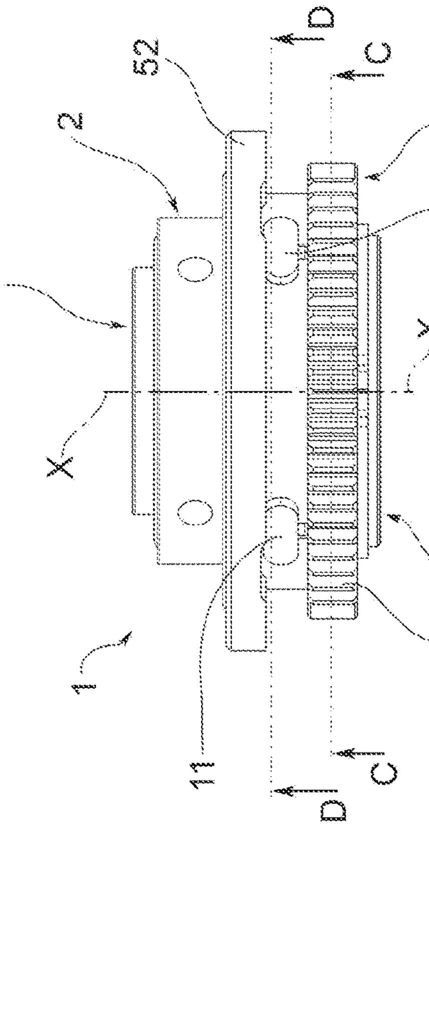
FIG. 14 shows an orthogonal elevation view of the bottle centering device of FIG. 7, illustrated with adjustment means arranged in a second operating position.
Figure 19:
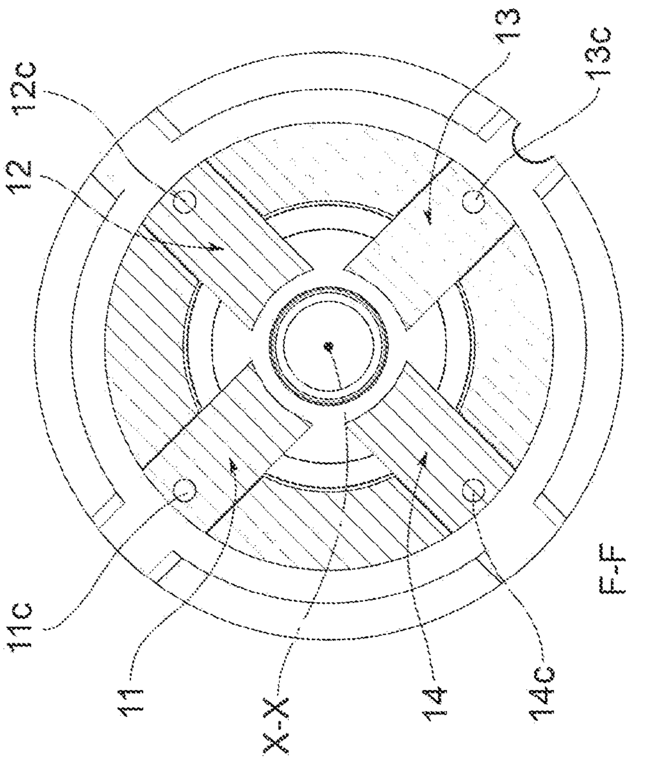
FIG. 19 shows an orthogonal sectional view of the bottle centering device of FIG. 17 according to the section plane F-F indicated therein.
Figure 18:
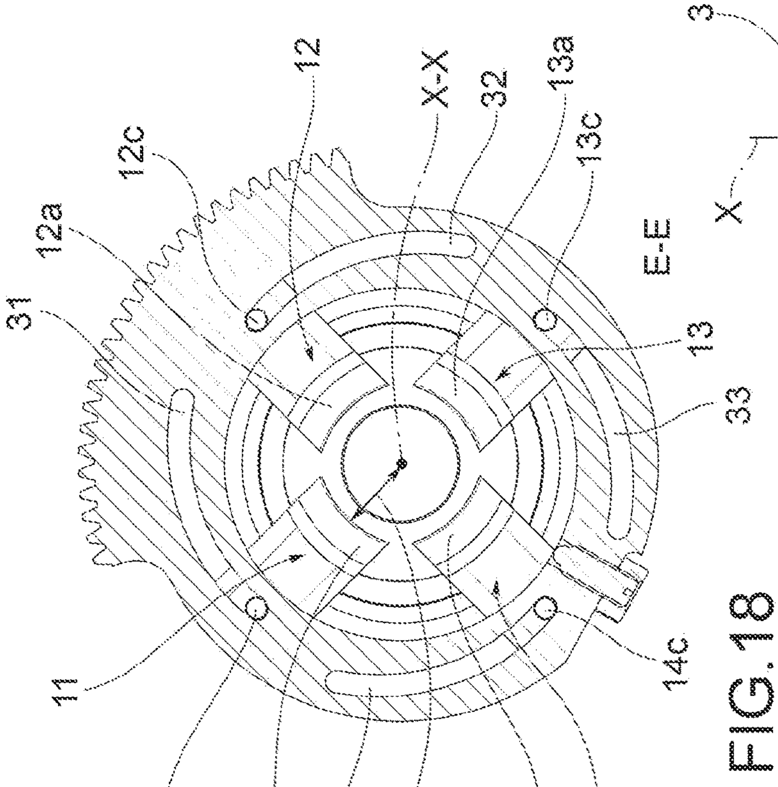
FIG. 18 shows an orthogonal sectional view of the bottle centering device of FIG. 17 according to the section plane E-E indicated therein.
Figure 17:
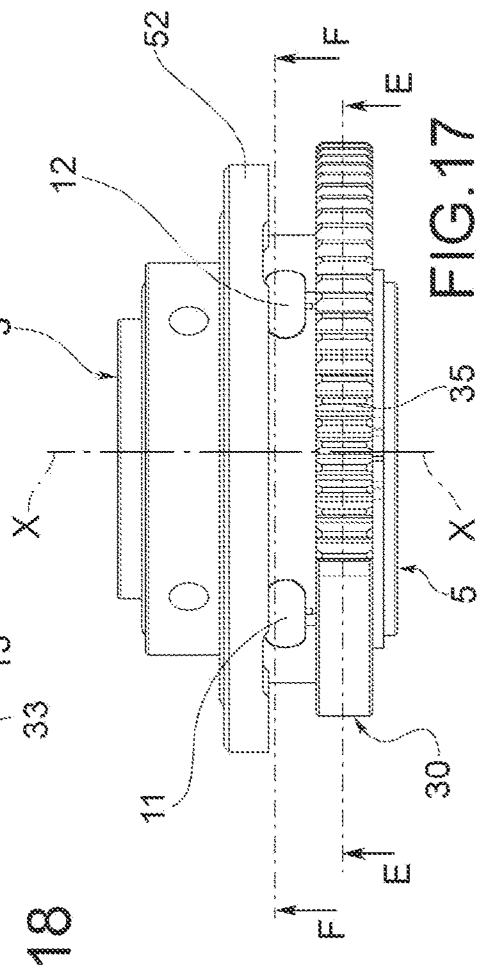
FIG. 17 shows an orthogonal elevation view of the bottle centering device of FIG. 7, illustrated with adjustment means arranged in a third operating position.

According to the invention, as may be seen from the sequence of FIGS. 13, 16 and 19, the pieces 11, 12, 13, 14 of said plurality of pieces are radially movable with respect to the central axis X in order to vary the radial dimensions of said invitation seat 10*a* and therefore of the relative central through opening 10*b*.

The bottle centering device 1 according to the invention therefore defines an invitation seat 10*a* having variable radial dimensions. By modifying the radial position of the pieces 11, 12, 13 and 14 it is in fact possible to vary the radial dimensions of the invitation seat 10*a* and therefore of the relative central through opening 10*b*.

Operationally, the invitation seat 10*a* defined by the bottle centering device 1 may therefore be adapted to the size of the mouth H of the bottles to be capped by varying the radial position of the pieces. In this way, by virtue of the invention, when the size of the mouth H of the bottles to be capped varies, it is no longer necessary to replace the bottle centering device, but it is possible—in a more practical and faster way—to adapt the invitation seat 10*a* to the new format of mouth H, by appropriately adjusting the radial position of the pieces with respect to the central axis X.

The bottle centering device 1 for capping machines for caps made of compressible material according to the invention therefore allows the operations for adjusting to the different sizes of bottle mouths in a capping machine to be simplified, avoiding problems connected with the replacement of the bottle centering device.

Furthermore, the bottle centering device 1 according to the invention is operationally simple to use.

Figure 10:
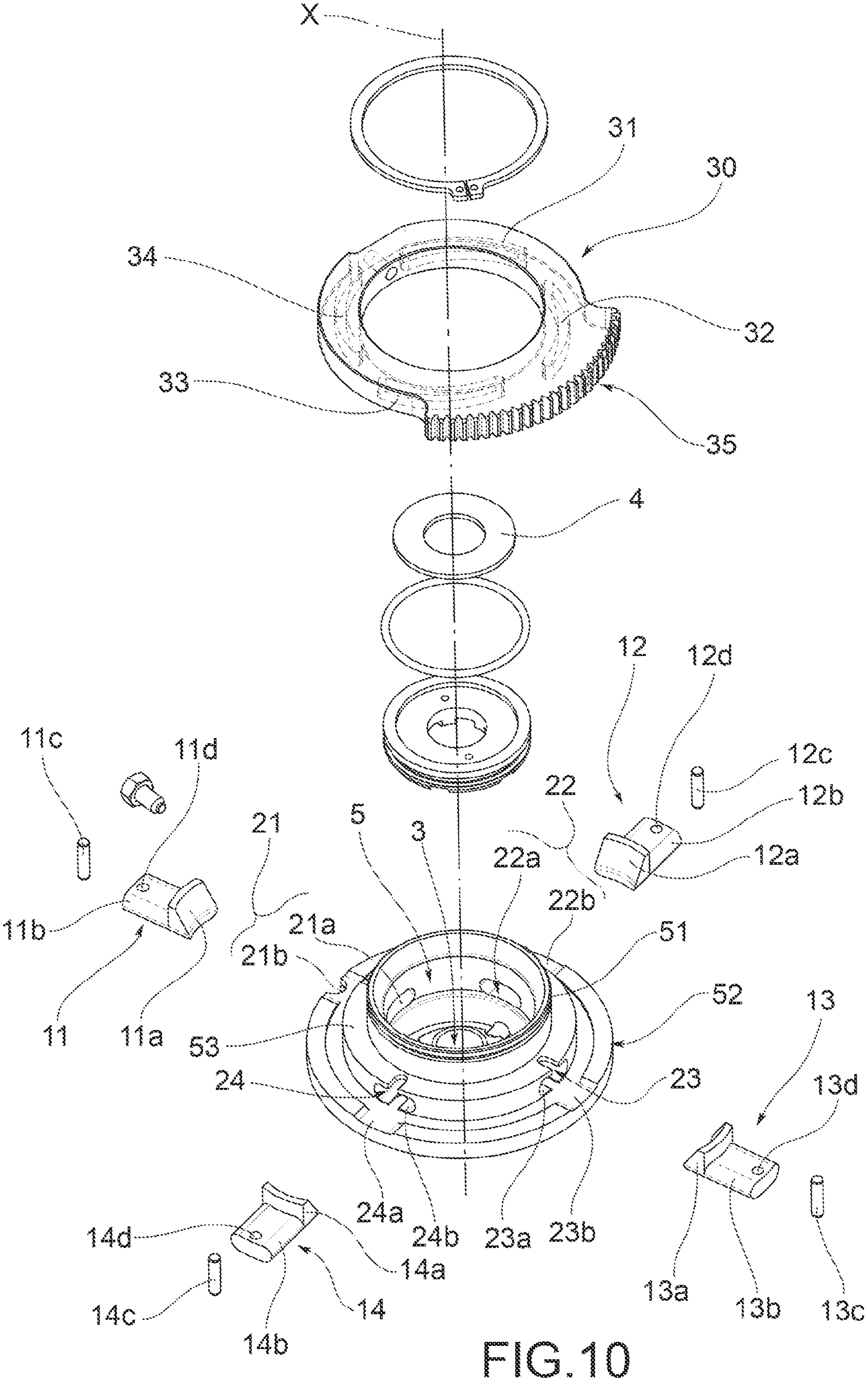
FIG. 10 shows an exploded view of the bottle centering device of FIG. 6.

According to the preferred embodiment illustrated in the accompanying figures, and in particular in FIG. 10, the aforementioned support structure 2 defines a radial sliding seat 21, 22, 23, 24 for each of said pieces 11, 12, 13, 14 with respect to the central axis X.

Each radial sliding seat 11, 12, 13, 14 is open on a mouth insertion chamber 5 which is delimited by said support structure 2 coaxially to said through opening 3 and is in turn open on said through opening 3.

The aforesaid pieces 11, 12, 13, 14 are inserted in the respective sliding seats 21, 22, 23, 24 in such a way that the respective shaped heads 11', 12', 13', 14' protrude inside said mouth insertion chamber 5 so as to define the aforementioned invitation seat 10*a* inside said insertion chamber 5.

In particular, as illustrated in the accompanying figures, the support structure 2 of the bottle centering device 1 may be defined by a flange which delimits the aforementioned through opening 3 with a first axial portion 2*a* and delimits the aforementioned insertion chamber 5 with a second axial portion 2*b*, opposite to the first. The through opening 3 and the mouth insertion chamber 5 are coaxial and communicate directly with each other. The aforementioned through opening 3 opens on the outside at a first face 2' of said flange, intended to be directly facing the compression box 101 at the cap compression seat 102*a*; the mouth insertion chamber 5 opens on the outside in an axially opposite position with respect to the through opening 3 at a second face 2" of said flange, intended to be turned towards the outside in use so as to receive the bottle B to be capped.

Advantageously, as shown in particular in FIG. 10, the aforementioned mouth insertion chamber 5 is delimited by a tubular portion 51 of said support structure 2 coaxial to said through opening 3. In particular, such tubular portion 51 projects axially with respect to the main body of the flange which defines the support structure 2 of the bottle centering device 1. The main body of the flange extends around the tubular portion 51 with an annular portion 52.

More in detail, each of the sliding seats 21, 22, 23 and 24 is defined for a first section by a through channel 21*a*, 22*a*, 23*a* and 24*a* which radially crosses the tubular portion 51 starting from the mouth insertion chamber 5 and for a second section by a groove 21*b*, 22*b*, 23*b* and 24*b* which extends radially into the annular portion 52 of the flange.

In particular, as illustrated in FIG. 10, each piece 11, 12, 13 and 14 comprises an elongated appendage 11*b*, 12*b*, 13*b* and 14*b* which extends from the respective shaped head 11*a*, 12*a*, 13*a* and 14*a* and is shaped to slidably insert into the respective sliding seat 21, 22, 23 and 24. In the opposite position to the shaped head, the elongated appendage 11*b*, 12*b*, 13*b* and 14*b* of each piece is provided with a protruding element 11*c*, 12*c*, 13*c* and 14*c*. Each piece is mounted in the sliding seat by inserting the respective elongated appendage into the through channel 21*a*, 22*a*, 23*a* and 24*a* until it reaches the groove 21*b*, 22*b*, 23*b* and 24*b*. Each piece is mounted in such a way as to have the respective shaped head inside the mouth insertion chamber 5 and the respective protruding element 11*c*, 12*c*, 13*c* and 14*c* outside said mouth insertion chamber 5. The shaped head and the protruding element are both sized so as not to pass through the through channel of the respective sliding seat and to act as a stop for the radial sliding movement for the piece. To allow the assembly of the piece, at least one of the protruding element 11*c*, 12*c*, 13*c* and 14*c* and/or the shaped head 11*a*, 12*a*, 13*a* and 14*a* is removably associated with the elongated appendage 11*b*, 12*b*, 13*b* and 14*b*. According to the embodiment illustrated in the accompanying figures, the shaped head is made in one piece with the elongated appendage, while the protruding element consists of a peg 11*c*, 12*c*, 13*c* and 14*c* associable (preferably in a removable manner) in a seat 11*d*, 12*d*, 13*d* and 14*d* formed in the elongated appendage.

Preferably, as illustrated in particular in FIGS. 11 to 19, the bottle centering device 1 comprises means for moving pieces 30, 31, 32, 33, 34 suitable to impart coordinated radial movements on all the pieces such that the radial distance D of the shaped heads 11', 12', 13', 14' with respect to the central axis X is the same for all the pieces 11, 12, 13, 14. In other words, the means for moving pieces 30, 31, 32, 33, 34 are configured to radially move the pieces so that each block is positioned radially with respect to the central axis X at a distance D1, D2, D3 equivalent to that assumed by the other pieces.

According to the preferred embodiment illustrated in the accompanying figures, the aforementioned means for moving pieces 30, 31, 32, 33, 34 comprise an adjustment ring nut 30 rotationally engaged on the tubular portion of the support structure 2 to rotate about said central axis X.

As shown in particular in FIGS. 10, 12, 15 and 18, a plurality of elongated seats 31, 32, 33, 34 are formed on the adjustment ring nut 30, one for each piece 11, 12, 13, 14.

Each of said elongated seats 31, 32, 33, 34 extends over an arc of circumference eccentric with respect to the central axis X.

Each elongated seat 31, 32, 33, 34 is mechanically engaged by a respective piece 11, 12, 13, 14 in such a way that an angular rotation of said adjustment ring 31 about the central axis X corresponds to an eccentric sliding of each elongated seat on the respective piece. Operationally, as illustrated in the sequence of FIGS. 12-13, 15-16 and 18-19, by virtue of the mechanical engagement between the piece and the elongated seat, the eccentric sliding of each elongated seat on the respective piece determines a radial movement of the piece as this the latter is constrained to slide radially along the respective radial sliding seat 21, 22, 23, 24. Therefore, the radial position of the pieces (indicated as distance D1, D2, D3 in FIGS. 12, 15 and 18) may be adjusted by varying the angular position of the adjustment ring nut 31 about the central axis X.

Advantageously, as illustrated in FIG. 10, the tubular portion 51 of said support structure 2 comprises an annular shoulder 53 which acts as a resting seat for the adjustment ring nut 31. Such annular shoulder 53 is formed in proximity to the sliding seats 21, 22, 23 and 24 so that the adjustment ring nut 31 may be mechanically engaged by the elongated appendages 11*b*, 12*b*, 13*b* and 14*b* which protrude from the through channels 21*a*, 22*a*, 23*a* and 24*a*.

Advantageously, each piece 11, 12, 13 and 14 engages the adjustment ring nut 31 in the respective elongated seat 31, 32, 33 and 34 at the protruding element 11*c*, 12*c*, 13*c* and 14*c*, which in particular may consist of a peg.

Preferably, the elongated seats 31, 32, 33, 34 are identical to each other so that they may impart an equal amount of radial movement to the respective pieces following an angular rotation of the adjustment ring nut 31 about the central axis X.

Advantageously, as illustrated in the accompanying figures, the adjustment ring nut 31 may be externally provided with a toothed portion 35 intended to engage with external mechanisms for motion application to be brought into rotation about said axis of rotation X.

Advantageously, the plurality of pieces 11, 12, 13, 14 comprises at least three pieces angularly equally distributed about said central axis X. Making the invitation seat 10*a* with at least three pieces ensures better centering of the mouth on the central axis X. It is possible however, to also provide an embodiment with only two pieces, preferably arranged in diametrically opposite positions. According to the embodiment illustrated in the accompanying figures, the pieces are four in number, angularly equally distributed about the central axis X.

Advantageously, the shaped head 11', 12', 13', 14' of each of said pieces 11, 12, 13, 14 comprises an invitation portion converging towards said through opening 3. Preferably, as illustrated in the accompanying figures, the aforementioned converging invitation portion is defined by a portion of a truncated conical surface.

Preferably, the bottle centering device 1 comprises an annular sealing gasket 4 which is placed between the through opening 3 and the aforementioned invitation seat 10*a* and is coaxial to the central axis X. Operationally, such annular sealing gasket 4 is intended to receive in abutment the upper edge of the mouth of the bottle to be capped, once the mouth, guided by the invitation seat 10*a*, has been axially centered on the through opening 3.

Advantageously, the pieces 11, 12, 13 and 14 are sized in such a way that, in any radial position they are with respect to the central axis X, the radial dimension of the central through opening 10*b* is always greater than the radial dimensions of the through opening 3 and of the central hole of the aforementioned annular sealing gasket 4. This ensures both the passage of the compressed cap from the through opening 3 towards the invitation seat 10*a*, and the fact that the bottle may be pushed inside the bottle centering device until the mouth is brought into contact with the annular sealing gasket 4.

The bottle centering device 1 for capping machines for caps made of compressible material according to the invention is operationally effective in centering the bottle.

Furthermore, the bottle centering device 1 for capping machines for caps made of compressible material according to the invention is constructively simple to produce.

The present invention also relates to a capping machine 100 for caps made of compressible material provided with the bottle centering device according to the invention.

As illustrated for example in FIGS. 20 to 23, the capping machine 100 for caps made of compressible material comprises:

- a compression box 101;
- one or more compression units 102, each of which is housed in a specially provided cavity made in said compression box and defines a cap compression seat 102*a;*
- a cap insertion punch 103 for each compression unit 102;
- a bottle centering device 1 for each compression unit 102.

Each bottle centering device 1 is mounted on said compression box 101 with its central axis X axially centered on the respective cap compression seat 102*a.*

Each bottle centering device is a bottle centering device 1 according to the invention, and in particular as described above.

The capping machine 100 may be:

- single, i.e. provided with a single compression unit and therefore with a single bottle centering device, or
- multiple, i.e. provided with a plurality and therefore with a plurality of bottle centering devices.

Preferably, the multiple capping machine is of the rotary type.

According to the preferred embodiment illustrated in the accompanying FIGS. 20 to 22, the capping machine 100 is a multiple capping machine, of the rotary type.

More in detail, the multiple capping machine 100 of the rotary type has an annular-shaped compression box 101 axially centered on a rotation axis Y of the capping machine itself. Such compression box 101 is associated with a plurality of compression units 102 angularly distributed about said rotation axis Y. A respective bottle centering device 1 is associated with each compression unit 102.

In general, a capping machine 100 for caps made of compressible material is known per se to those skilled in the art, with the exception of the bottle centering device 1 according to the invention. For this reason, a detailed description of such capping machine 100 and in particular of the compression box 101 and of the cap compression unit 102 which defines the cap compression seat will not be provided. The compression box 101 and the cap compression unit 102 may be of any type. In particular, as already highlighted above, the cap compression unit 102 may be of the type described in the Italian utility model 214969 or in the European patent EP 1426322 B1.

As shown in particular in FIG. 23, each bottle centering device 1 is associated—through its support structure 2—with the compression box 101 of the capping machine 100 at a cap compression seat, defined by a cap compression unit 102. The support structure 2 is mounted on the compression box 101 in such a way that the through opening 3 has its own central axis X axially centered on the cap compression seat 102*a.*

Preferably, each of said bottle centering devices 1 is provided with means for moving pieces 30, 31, 32, 33, 34, as previously described. In particular, the aforesaid means for moving pieces comprise the aforesaid adjustment ring nut 30 externally provided with the toothed portion 35.

Preferably, the multiple capping machine 100 comprises a common actuation device 104, 105 of all the aforementioned bottle centering devices 1. The aforementioned common actuation device 104, 105 is kinematically connected to the means for moving pieces 30, 31, 32, 33, 34 of each of said bottle centering devices 1.

According to the embodiment illustrated in particular in FIGS. 21 and 22, the aforementioned common actuation device 104, 105 comprises:

- a toothed adjustment ring 104 which is rotationally associated with the compression box 101 to rotate about said axis of rotation Y of the capping machine and is engaged with the toothed portion 35 of the adjustment ring nut 30 of each of said bottle centering devices 1; and
- a pinion 105 which is associated with said compression box 101 and is engaged with said toothed adjustment ring 104.

Operationally, the pinion 105 is operable to rotate the aforementioned toothed adjustment ring 104 and therefore the adjustment ring nuts 30 of each bottle centering device 1. In this way, it is possible to centrally adjust the radial dimensions of the invitation seats 10*a* of all the bottle centering devices 1 as a function of the size of the neck of the bottles to be capped.

Advantageously, the pinion 105 is operable by a manually activatable mechanism (as illustrated in FIG. 22) or by a motorized mechanism.

Advantageously, as illustrated in FIG. 22, the manually activatable mechanism is provided with a graduated position scale 106 configured to associate each angular position assumed by the pinion with a corresponding radial dimension of the invitation seats of each bottle centering device 1.

In the case of a motorized mechanism for actuating the pinion, the control is entrusted to a control unit (not illustrated in the accompanying figures) which intervenes on the motorized mechanism automatically and with extreme precision, on the basis of data suitably set via a control panel of the machine.

Advantageously, the adjustment of the bottle centering devices 1 (intended as adjustment of the radial dimensions of the invitation seats 10*a*) may be carried out in different degrees of automation:

- Manual and individual adjustment: the operator individually adjusts each bottle centering device 1 by acting on the adjustment ring nut, which for this purpose is provided with a graduated position scale;
- Centralized manual adjustment: the operator adjusts all the bottle centering devices 1 at the same time by activating the toothed ring which engages with the adjustment ring nuts of all the bottle centering devices;

Automatic centralized adjustment: the operator adjusts all the bottle centering devices 1 simultaneously by a centralized control unit which activates the toothed ring by a motorized mechanism; all bottle centering devices are adjusted automatically and with extreme precision.

The invention allows numerous advantages to be obtained, which have already been described in part.

The bottle centering device 1 for capping machines for caps made of compressible material allows the operations for adjusting to the different sizes of bottle mouths in a capping machine to be simplified.

In particular, the bottle centering device 1 according to the invention allows:

- drastically reducing the setting times of a capping machine in the step of adjusting to the mouth formats of the bottles to be capped;
- offering superior flexibility in adjusting to a considerable number of bottle formats;
- eliminating the components which in the solutions of the prior art are intended for the bottle format change.

All this translates into an optimization of both plant costs and management costs, allowing a recovery of production efficiency.

The bottle centering device 1 according to the invention is operationally simple to use and at the same time effective in centering the bottle.

Finally, the bottle centering device 1 according to the invention is constructively simple to produce.

The same advantages as those described for the bottle centering device 1 according to the invention apply to the capping machine 100 according to the invention.

The invention thus conceived therefore achieves its intended objects.

Obviously, in its practical embodiment it may also assume forms and configurations different from the one illustrated above, without thereby departing from the present scope of protection.

Furthermore, all details may be replaced with technically equivalent elements, and the dimensions, shapes, and materials used may be any according to the needs.

The invention claimed is:

1. A bottle centering device for a capping machine for caps made of compressible material, wherein said bottle centering device comprises:

- a support structure associated with a compression box of a capping machine at a cap compression seat, and which defines a through opening for passage of a compressed cap and a cap insertion punch of said capping machine, said support structure being mountable on said compression box so that said through opening has a central axis axially centered on said cap compression seat;
- bottle centering means associated with said support structure and defining an invitation seat which defines a central through opening, is configured for engagement by a mouth of a bottle to be capped and is shaped to guide said mouth towards said through opening axially aligning said mouth with the central axis of said through opening;
- an annular sealing gasket which is placed between the through opening and said invitation seat and is coaxial to the central axis;
- wherein said bottle centering means comprise a plurality of pieces which are angularly distributed about the central axis of said through opening and each of the plurality of pieces defines with a respective shaped head a portion of said invitation seat, wherein the pieces of said plurality of pieces are radially movable with respect to the central axis to vary radial dimensions of said invitation seat and of said central through opening.

2. The bottle centering device according to claim 1, comprising means for moving pieces configured to impart coordinated radial movements on all the pieces such that a radial distance of the shaped heads with respect to the central axis is the same for all the pieces.

3. The bottle centering device according to claim 1, wherein said support structure defines a radial sliding seat for each of said pieces with respect to the central axis, each radial sliding seat being open on a mouth insertion chamber which is delimited by said support structure coaxially to said through opening and is open on said through opening, and wherein said pieces are inserted in the respective sliding seats so that the respective shaped heads protrude inside said mouth insertion chamber.

4. The bottle centering device according to claim 3, wherein said mouth insertion chamber is delimited by a tubular portion of said support structure coaxial to said through opening.

5. The bottle centering device according to claim 1, wherein said plurality of pieces comprises at least three pieces angularly equally distributed about said central axis.

6. The bottle centering device according to claim 1, wherein the shaped head of each of said pieces comprises an invitation portion converging towards said through opening.

7. The bottle centering device according to claim 1, wherein said plurality of pieces comprises four pieces angularly equally distributed about said central axis.

8. A capping machine for caps made of compressible material, comprising:

a compression box;

one or more compression units, each of the compression units is housed in a cavity made in said compression box and defines a cap compression seat;

a cap insertion punch for each compression unit;

a bottle centering device for each compression unit, each bottle centering device being mounted on said compression box with a central axis axially centered on the respective cap compression seat, wherein each bottle centering device is a bottle centering device according to claim 1.

9. The capping machine according to claim 8, wherein said capping machine is a multiple rotary type capping machine, having the compression box of an annular shape axially centered on a rotation axis of said capping machine, and wherein said compression box supports a plurality of compression units angularly distributed around said rotation axis, a respective bottle centering device being associated with each compression unit.

10. A bottle centering device for a capping machine for caps made of compressible material, wherein said bottle centering device comprises:

a support structure associated with a compression box of a capping machine at a cap compression seat, and which defines a through opening for passage of a compressed cap and a cap insertion punch of said capping machine, said support structure being mountable on said compression box so that said through opening has a central axis axially centered on said cap compression seat;

bottle centering means associated with said support structure and defining an invitation seat which defines a central through opening, is configured for engagement by a mouth of a bottle to be capped and is shaped to guide said mouth towards said through opening axially aligning said mouth with the central axis of said through opening;

means for moving pieces configured to impart coordinated radial movements on all the pieces such that a radial distance of the shaped heads with respect to the central axis is the same for all the pieces, wherein said means for moving pieces comprise an adjustment ring nut rotationally engaged on the tubular portion of said support structure to rotate about said central axis, on said adjustment ring nut are made a plurality of elongated seats with one ring nut for each piece, each of said elongated seats extending on an arc of circumference eccentric with respect to said central axis, and wherein each elongated seat is engaged by a respective piece, so that an angular rotation of said adjustment ring nut about said central axis corresponds to an eccentric sliding of each elongated seat on the respective piece, said eccentric sliding determining a radial movement of the piece, which is constrained to slide radially along the respective radial sliding seat;

wherein said bottle centering means comprise a plurality of pieces which are angularly distributed about the central axis of said through opening and each of the plurality of pieces defines with a respective shaped head a portion of said invitation seat, wherein the pieces of said plurality of pieces are radially movable with respect to the central axis to vary radial dimensions of said invitation seat and of said central through opening;

wherein said support structure defines a radial sliding seat for each of said pieces with respect to the central axis, each radial sliding seat being open on a mouth insertion chamber which is delimited by said support structure coaxially to said through opening and is open on said through opening, and wherein said pieces are inserted in the respective sliding seats so that the respective shaped heads protrude inside said mouth insertion chamber; and wherein said mouth insertion chamber is delimited by a tubular portion of said support structure coaxial to said through opening.

11. The bottle centering device according to claim 10, wherein said elongated seats are identical to each other.

12. The bottle centering device according to claim 10, wherein said adjustment ring nut is externally provided with a toothed portion configured to engage with an external mechanisms for motion application to be brought into rotation about said axis of rotation.

13. A capping machine for caps made of compressible material, comprising:

a compression box;

one or more compression units, each of the compression units is housed in a cavity made in said compression box and defines a cap compression seat;

a cap insertion punch for each compression unit;

a bottle centering device for each compression unit, each bottle centering device being mounted on said compression box with a central axis axially centered on the respective cap compression seat, wherein each bottle centering device comprises:

a support structure associated with a compression box of a capping machine at a cap compression seat, and which defines a through opening for passage of a compressed cap and a cap insertion punch of said capping machine, said support structure being mountable on said compression box so that said through opening has a central axis axially centered on said cap compression seat;

bottle centering means associated with said support structure and defining an invitation seat which defines a central through opening, is configured for engagement by a mouth of a bottle to be capped and is shaped to guide said mouth towards said through opening axially aligning said mouth with the central axis of said through opening;

a common drive device of all of said bottle centering devices, said common drive device being kinematically connected to the means for moving pieces of each of said bottle centering devices;

wherein said bottle centering means comprise a plurality of pieces which are angularly distributed about the central axis of said through opening and each of the plurality of pieces defines with a respective shaped head a portion of said invitation seat, wherein the pieces of said plurality of pieces are radially movable with respect to the central axis to vary radial dimensions of said invitation seat and of said central through opening; and wherein said capping machine is a multiple rotary type capping machine, having the compression box of an annular shape axially centered on a rotation axis of said capping machine, and wherein said compression box supports a plurality of compression units angularly distributed around said rotation axis, a respective bottle centering device being associated with each compression unit.

14. The capping machine according to claim 13, wherein said common drive device comprises:

a toothed adjustment ring rotationally associated with said compression box to rotate about said axis of rotation and is engaged with the toothed portion of the adjustment ring nut of each of said bottle centering devices; and a pinion which is associated with said compression box and is engaged with said toothed adjustment ring and is operable, by a manually activatable mechanism or by a motorized mechanism, to rotate said toothed adjustment ring.

15. A bottle centering device for a capping machine for caps made of compressible material, wherein said bottle centering device comprises:

a support structure associated with a compression box of a capping machine at a cap compression seat, and which defines a through opening for passage of a compressed cap and a cap insertion punch of said capping machine, said support structure being mountable on said compression box so that said through opening has a central axis axially centered on said cap compression seat;

bottle centering means associated with said support structure and defining an invitation seat which defines a central through opening, is configured for engagement by a mouth of a bottle to be capped and is shaped to guide said mouth towards said through opening axially aligning said mouth with the central axis of said through opening;

wherein said bottle centering means comprise a plurality of pieces which are angularly distributed about the central axis of said through opening and each of the plurality of pieces defines with a respective shaped head a portion of said invitation seat, wherein the pieces of said plurality of pieces are radially movable with respect to the central axis to vary radial dimensions of said invitation seat and of said central through opening; and wherein the shaped head of each of said pieces comprises an invitation portion converging towards said through opening, said converging invitation portion being defined by a portion of a truncated conical surface.

* * * * *